(12) United States Patent
Nagasaka

(10) Patent No.: US 8,463,433 B2
(45) Date of Patent: Jun. 11, 2013

(54) CONTROL SYSTEM, CONTROL METHOD, AND ROBOT APPARATUS

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 12/248,121

(22) Filed: Oct. 9, 2008

(65) Prior Publication Data

US 2009/0105878 A1 Apr. 23, 2009

(30) Foreign Application Priority Data

Oct. 19, 2007 (JP) ................................. 2007-272099

(51) Int. Cl.
*B25J 13/00* (2006.01)
(52) U.S. Cl.
USPC ........... 700/245; 700/260; 700/261; 700/263; 700/253; 700/258; 318/568.16
(58) Field of Classification Search
USPC ................. 700/245, 243, 258, 254, 260, 261, 700/262, 263, 253; 318/568.16
See application file for complete search history.

(56) References Cited

U.S. PATENT DOCUMENTS

| | | | | |
|---|---|---|---|---|
| 4,640,663 A | * | 2/1987 | Niinomi et al. | 414/730 |
| 7,136,722 B2 | * | 11/2006 | Nakamura et al. | 700/245 |
| 7,313,463 B2 | * | 12/2007 | Herr et al. | 700/245 |
| 7,698,020 B2 | * | 4/2010 | Kawai et al. | 700/245 |
| 7,805,218 B2 | * | 9/2010 | Nagasaka | 700/245 |
| 2001/0029406 A1 | * | 10/2001 | Okamoto et al. | 700/258 |
| 2003/0227271 A1 | * | 12/2003 | Shindo | 318/439 |
| 2005/0228540 A1 | * | 10/2005 | Moridaira | 700/245 |
| 2006/0149420 A1 | * | 7/2006 | Ikeuchi | 700/245 |
| 2007/0021870 A1 | * | 1/2007 | Nagasaka | 700/245 |
| 2007/0083290 A1 | | 4/2007 | Nagasaka | |

FOREIGN PATENT DOCUMENTS

| | | |
|---|---|---|
| EP | 0 965 416 A1 | 12/1999 |
| EP | 965416 A1 * | 12/1999 |
| EP | 0965416 A1 * | 12/1999 |
| EP | 1 103 451 A2 | 5/2001 |

(Continued)

OTHER PUBLICATIONS

Yamada et al., Artificial Finger Skin having Ridges and Distributed Tactile Sensors used for Grasp Force Control, 2002, Journal of Robotics and Mechatronics, vol. 14, No. 2, 2002.4.*

(Continued)

*Primary Examiner* — Thomas Black
*Assistant Examiner* — Sara Lewandroski
(74) *Attorney, Agent, or Firm* — Wolf, Greenfield & Sacks, P.C.

(57) ABSTRACT

There is provided a control system which controls a link structure constructed by connecting a plurality of rigid body links and driven by making a joint actuator generate an actuator force. The control system includes a mechanical model including geometric parameters and dynamical parameters of the link structure, a virtual external force calculating means for calculating a virtual force acting on the mechanical model of the link structure, a contact part detecting means for detecting contact parts between the link structure and the outside, and an actual force converting means for converting the virtual force calculated by the virtual external force calculating means into an external force capable of existing actually and the actuator force of the joint actuator, using contact information detected by the contact part detecting means. The joint actuator is made to generate the actuator force output by the actual force converting means.

7 Claims, 11 Drawing Sheets

FOREIGN PATENT DOCUMENTS

| | | | |
|---|---|---|---|
| EP | 1103451 | A2 * | 5/2001 |
| EP | 1 334 901 | A2 | 8/2003 |
| EP | 1 393 866 | A1 | 3/2004 |
| EP | 1 649 985 | A1 | 4/2006 |
| JP | 05-305583 | | 11/1993 |
| JP | 10-230485 | A | 9/1998 |
| JP | 2003-089091 | A | 3/2003 |
| JP | 2003-231077 | A | 8/2003 |
| JP | 2004-181613 | A | 7/2004 |
| JP | 2007-030054 | A | 2/2007 |
| JP | 2007-108955 | A | 4/2007 |

OTHER PUBLICATIONS

Yamada et al., Artifical Finger Skin having Ridges and Distributed Tactile Sensors used for Grasp Force Control, 2002, Journal of Robotics and Mechantronics, vol. 14, No. 2, 2002.4.*

Yamada et al., "Artifical Finger Skin having ridges and distributed tactile sensors used for grasp force control," 2001, IEEE.*

Yamada et al., Artifical finger skin having ridges and distributed tactile sensors used for grasp force control, 2001, IROS.*

Yamada et al., Artifical Finger Skin having Ridges and Distributed Tactile Sensors used for Grasp Force Control, 2001, IROS.*

Chardonnet et al., Dynamic simulator for humanoids using constraint-based method with static friction, Dec. 2006, IEEE.*

Kageyama et al., "Development and Applications of Multivalued Touch Sensor that Cover Robot", pp. 259-260.

Kagami et al., "Development of a Humanoid H4 with Soft and Distributed Tactile Sensor Skin", Preprints for 6$^{th}$ Intl. Symposium on Experimental Robotics, pp. 125-133; Mar. 1999.

Inaba et al., "A Full-Body Tactile Sensor Suit Using Electrically Conductive Fabric and Strings", pp. 97-104, Proc. IROS96, 1996 IEEE.

Sentis et al., "Task-Oriented Control of Humanoid Robots Through Prioritization", IEEE-RAS/RSJ International Conference on Humanoid Robots; pp. 1-16.

Hyon et al., Full-body compliant human-humanoid interaction: balancing in the presence of unknown external forces. IEEE Trans on Robotics. 2007;23(5):884-98.

Sugihara et al., Whole-body cooperative reaction force manipulation on legged robots with COG Jacobian involving implicit representation of unactuated coordinates. JRSJ. Mar. 2006;24(2):222-231.

* cited by examiner

CONTROL SYSTEM, CONTROL METHOD, AND ROBOT APPARATUS

CROSS REFERENCES TO RELATED APPLICATIONS

The present invention contains subject matter related to Japanese Patent Application JP 2007-272099 filed in the Japanese Patent Office on Oct. 19, 2007, the entire contents of which being incorporated herein by reference.

BACKGROUND OF THE INVENTION

1. Field of the Invention

The present invention relates to a control system and a control method for a link structure which is constructed by connecting a plurality of rigid bodies, and a robot apparatus, and particularly, to a control system, a control method, and a robot apparatus which sense an unknown environment and obtain a proper external force from surrounding environments which vary every moment, thereby properly adjusting the generating forces of actuators so that a desired task may be achieved.

More specifically, the present invention relates to a control system, a control method, and a robot apparatus which perform not only the precision of positions or postures but dexterous operation of forces, and realize services accompanied by interaction with persons or objects, and particularly, to a control system, a control method, and a robot apparatus which exactly solve a mechanical model while external forces having contact parts as points of action are properly used, thereby determining the generating force target value of each joint actuator, and which compensate a force which is difficult to model in each joint, thereby realizing favorable tactile force interaction in which points of actions are not limited.

2. Description of the Related Art

With the rapid arrival of an aging society, it is expected that the ratio of elderly people and productive-age population which supports the elderly people will be 1 person:2.4 persons in 2015, and 1 person:2.1 persons in 2025 from 1 person: 3.3 persons at the present time (2005). As such, it is imperative to make the elderly people whose ratio occupied in the composition of population increases rapidly live as healthily and actively as possible without requiring nursing care, and to make a society in which relapse can be prevented as much as possible even if the elderly people require nursing care, and they can lead independent lives.

With the arrival of such an aging society, the need for mechatronics instruments aiming at assistance in elderly people's minds and bodies is increasing in elderly-people nursing care facilities or at homes which have elderly people. Further, the need for mental assistance in which robots are effectively incorporated in occupational therapy as well as physical assistance called power assistance of walking aids or upper limbs exists.

In the above field, the mechatronics instruments should execute a task while making physical contact with people or complicated actual environments flexibly and safely. That is, unlike the fact that existing industrial robots performed fixed motions under a known environment, the above mechatronics instruments should sense an unknown environment and obtain a proper external force from surrounding environments which vary every moment, thereby properly adjusting the generating forces of actuators so that a desired task may be achieved.

As such an environment-adaptive robot control method, for example, a control method of measuring a peripheral environment shape using a stereoscopic view using a plurality of cameras, or a laser range finder, and correcting the position and posture of a robot so as to suit the above shape is tried in the related art (for example, refer to "A Modular Architecture for Humanoid Robot Navigation" (Proceedings of 2005 5th IEEERAS International Conference on Humanoid Robots, pp. 26-31), and "Vision-based 2.5D terrain modeling for humanoid locomotion" (In Int. Conf. on Robotics and Automation (ICRA), Taipei, Taiwan, 2003)). However, this control method has a problem in that updating rate is low because not only the precision of the cameras is required, but the amount of operation when the peripheral environment shape is reproduced on the basis of measurement results increases. Further, since this control method is based on positional control, it is considered that it is difficult to reactively adapt to an environment.

The positional control is commonly called "hard control" because its basic purpose is to hold a position, and is not suitable for responding to an external force flexibly or for precisely performing the control of velocity or acceleration. For example, robot apparatuses which execute a task while performing physical interaction with various outsides originally have low compatibility with the positional control.

In contrast, it is considered that force control is ideally driven by a force control system although a control law or a system construction becomes complicated. For example, a method arranging a force sensor in an end effector or a leg part, and manipulating a surrounding object while measuring an applied force from an environment, or adapting a robot to an irregular ground is also suggested (for example, refer to "Force Feedback Sensor" (Journal of Robotics Society of Japan, Vol. 6, No. 9, pp. 759-765, 1991), and "Development and Application of a Robot Surface Multiple-valued Contact Sensor" (Lecture Draft Collections of Robotics and Mechatronics Lecture Meeting 98 by Japan Society of Mechanical Engineers, 1CI1-2, 1998)). However, it is technically difficult to arrange force sensors so that the sensors can detect forces acting on a robot body without omission, and as a result, it is considered that parts where contact with an environment is not permitted may be generated. In other words, in order to exactly solve a mechanical model to realize tactile force interaction, the point of action of an external force is limited.

Although investigations in which contact sensors are arranged in a distributed manner on a whole body in order to acquire a contact state with an environment are also mentioned (for example, "Development and Application of a Robot Surface Multiple-valued Contact Sensor" (Lecture Draft Collections of Robotics and Mechatronics Lecture Meeting 98 by Japan Society of Mechanical Engineers, 1CI1-2, 1998), "Development and Application of Flexible Tactile Sensor for Robots Using Conductive Gel" (Draft Collections of 16th Academic Lecture Meeting of Robotics Society of Japan, 873-874, 1998), and "Whole-Body-Coated Tactile Sensor Using Conductive Fabric" (Journal of Robotics Society of Japan. Vol. 16, No. 1, pp. 80-86, 1998)), sufficient consideration is not performed from the viewpoint of mechanics or control, such as whether it is desirable what degree of force should be imposed on a contact point in order to achieve a task. For this reason, even if the contact state with an environment can be detected, it cannot be said that the capability for achieving a target task under this contact state has been achieved.

Although a torque calculation method of exactly solving a mechanical model to determine the joint torque for generating a specified force in a predetermined part is also suggested (for example, refer to "A prioritized multi-objective dynamic controller for robots in human environments" (In Proceeding of the IEEE/RSJ International Conference on Humanoid Robots, 2004)), an attribute (disturbances), which is difficult to model, resulting from gear friction, etc. is included within a joint. Thus, there is a problem in that, unless this main attribute is properly handled, an error may be caused, and vibration may be excited.

A further example of the related art includes JP-A-5-305583.

SUMMARY OF THE INVENTION

It is desirable to provide excellent control system and control method for a link structure constructed by connecting a plurality of rigid bodies, and a robot apparatus.

It is also desirable to provide excellent control system, control method, and robot apparatus, capable of sensing an unknown environment and obtain a proper external force from surrounding environments which vary every moment, thereby properly adjusting the generating forces of actuators so that a desired task may be achieved.

It is also desirable to provide excellent control system, control method, and robot apparatus, capable of performing not only the precision of positions or postures but dexterous operation of forces, and realizing services accompanied by interaction with persons or objects.

It is also desirable to provide excellent control system, control method, and robot apparatus, capable of exactly solving a mechanical model while external forces having contact parts as points of action are properly used, thereby determining the generating force target value of each joint actuator, and capable of compensating a force which is difficult to model in each joint, thereby realizing favorable tactile force interaction in which points of actions are not limited.

According to an embodiment of the present invention, there is provided a control system which controls a link structure constructed by connecting a plurality of rigid body links via joints and driven by making a joint actuator generate an actuator force. The control system includes a mechanical model including geometric parameters and dynamical parameters of the link structure, a virtual external force calculating means for calculating a virtual force acting on the mechanical model of the link structure, a contact part detecting means for detecting contact parts between the link structure and the outside, an actual force converting means for converting the virtual force calculated by the virtual external force calculating means into an external force capable of existing actually and the actuator force of the joint actuator, using contact information detected by the contact part detecting means. The joint actuator is made to generate the actuator force output by the actual force converting means.

Here, the term "system" means an object in which a plurality of devices (or functional modules which realize specific functions) are logically assembled, and whether or not each device or each functional module is within a single housing does not matter particularly.

Mechatronics instruments composed of link structures, such as robots are required to execute a task while making physical contact with people or complicated actual environments flexibly and safely. Thus, unlike industrial robots which perform fixed motions under a known environment, the above mechatronics instruments should sense an unknown environment and obtain a proper external force from surrounding environments which vary every moment, thereby properly adjusting the generating forces of actuators so that a desired task may be achieved. Further, in a control method based on positional control, it is difficult to reactively adapt to an environment. Thus, it is considered that it is desirable that force control is ideally driven by a force control system.

However, it is technically difficult to arrange force sensors so that the sensors can detect forces acting on a robot body without omission, and there are parts where contact with an environment is not permitted. Therefore, in order to exactly solve a mechanical model to realize tactile force interaction, the point of action of an external force is limited.

Further, an attribute (disturbances), which is difficult to model, resulting from gear friction, etc. is included within a joint. Thus, there is a problem in that, unless this main attribute is properly handled, an error may be caused, and vibration may be excited.

In contrast, the control system according to the embodiment of the present invention calculates a virtual force acting on a mechanical model of a link structure, while the contact sensors are arranged in a distributed manner over the whole body surface in order to detect contact parts between the link structure and the outside without omission. Thus, the generating force target values of all the actuators can be determined by converting the above virtual force into an external force and an actuator force capable of existing actually, using the contact information detected by such a contact part detecting means, thereby exactly solving a mechanical model.

Moreover, in the control system according to the embodiment of the present invention, the torque sensor is disposed in a joint part. Thus, a force which is difficult to model is compensated by performing torque feedback control such that the variation between the above calculated actuator force and the torque which the torque sensor has detected is minimized.

Accordingly, according to the embodiment of the present invention, excellent tactile force interaction in which points of action are not limited can be realized.

According to the embodiment of the present invention, it is possible to provide excellent control system, control method, and robot apparatus, capable of sensing an unknown environment and obtain a proper external force from surrounding environments which vary every moment, thereby properly adjusting the generating forces of actuators so that a desired task may be achieved.

Further, according to the embodiment of the present invention, it is possible to provide excellent control system, control method, and robot apparatus, capable of performing not only the precision of positions or postures but dexterous operation of forces, and realizing services accompanied by interaction with persons or objects.

According to the embodiment of the present invention, generating force target values of all actuators are determined by detecting contact parts with the outside without omission, using contact sensors arranged in a distributed manner over the whole body surface of a link structure, such as a robot, and by exactly solving a mechanical model so that a desired motion may be achieved, while external forces having the detected contact parts as points of action are properly used. Moreover, favorable tactile force interaction in which points of action are not limited can be realized by compensating a force, which is difficult to model, within each joint which connects links by a torque sensor provided at a joint part.

Other objects, features, and advantages of the present invention will become apparent from the embodiments of the present invention to be described or more detailed description based on the attached drawings.

BRIEF DESCRIPTION OF THE DRAWINGS

FIG. 7 is a view showing an aspect in which a direction of a vertical reaction force and directions of a frictional force in a part where a contact sensor is arranged are determined, and an operational space is defined, when the contact sensor CS is turned on.

DESCRIPTION OF THE PREFERRED EMBODIMENTS

Hereinafter, embodiments of the present invention will be described in detail with reference to the drawings.

The present invention relates to a control system of a link structure constructed by connecting a plurality of rigid bodies. An example of the link structure referred to here is a humanoid robot.

Figure 1:
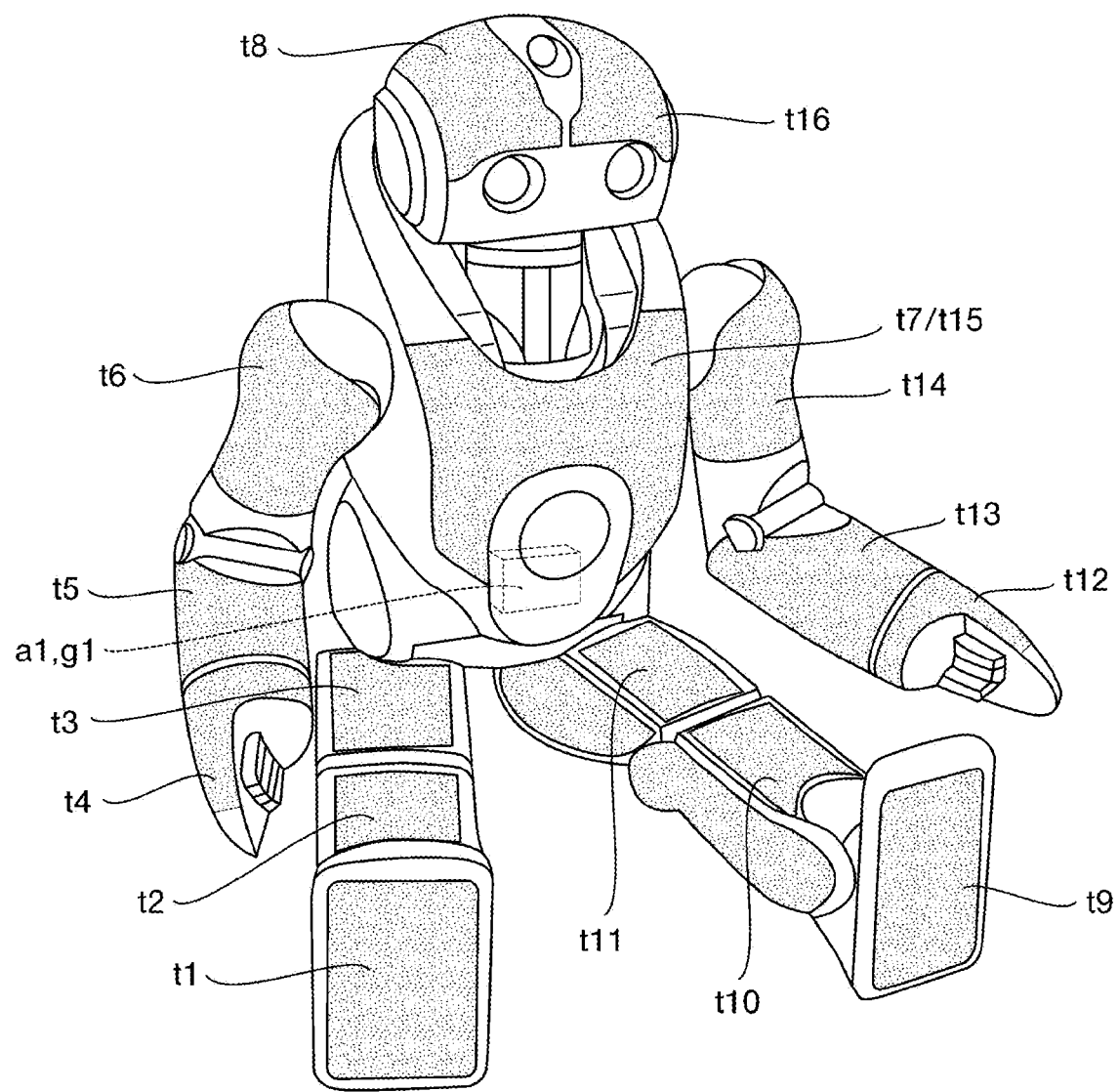
FIG. 1 is a view the external construction of a humanoid robot to which an embodiment of the present invention can be applied.

The external construction of the humanoid robot to which the present invention can be applied is shown in FIG. 1. In the humanoid robot shown, an upper body is connected to a pelvic part via two leg bodies as a moving means, and a waist joint. Two arm parts are connected to the upper body, and a head part is connected to the upper body via a neck joint.

The right and left leg bodies are provided with a total of six degrees of freedom including three degrees of freedom of a hip joint, one degree of freedom of a knee joint, and two degrees of freedom of an ankle joint, respectively. Further, the right and left arm parts are provided with a total of six degrees of freedom including three degrees of freedom of a shoulder joint, one degree of freedom of an elbow joint, and two degrees of freedom of a wrist joint, respectively. Both the neck joint and the waist joint have three degrees of freedom around X, Y, and the Z axes.

Actuators which drive respective joint shafts are composed of, for example, a DC brushless motor, a reducer, and a position sensor which detects the rotational position of an output shaft of the reducer. These joint driving actuators are connected with a host computer which generally controls the whole operation of the humanoid robot, so that positional control target values thereof can be given from the host computer, and current joint angles or current joint angular velocities can be transmitted to the host computer.

Figure 2:
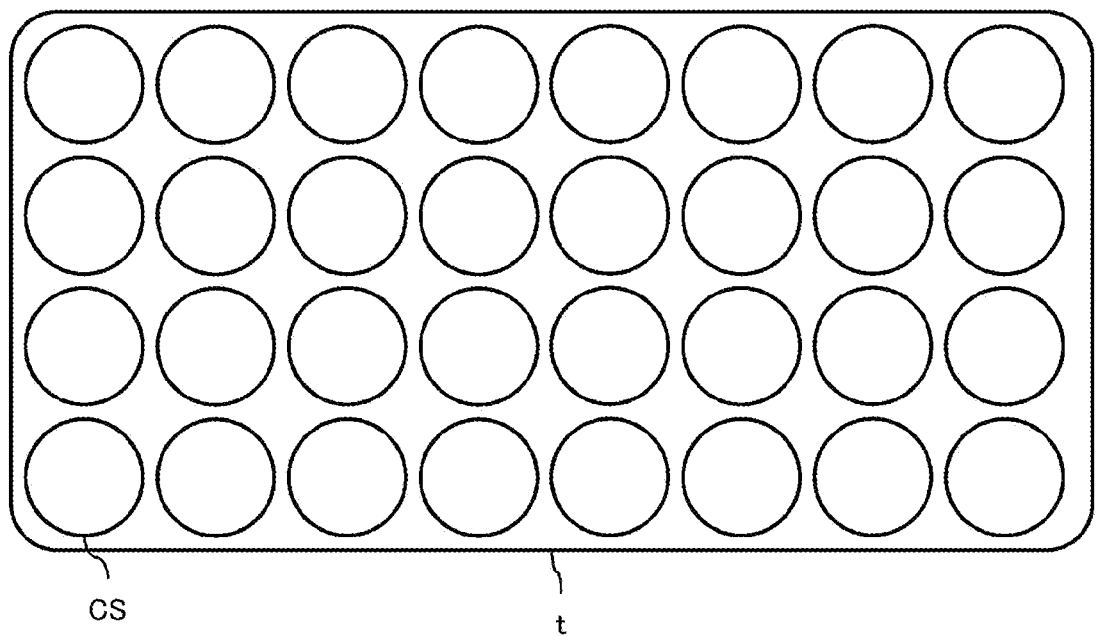
FIG. 2 is a view showing the construction of a tactile sensor group.

Tactile sensor groups t1, t2, . . . , and t16 are respectively attached to parts where contact with the outside is assumed, among the surface of the humanoid robot shown in FIG. 1. The construction of one tactile sensor group is shown in FIG. 2. As shown in this drawing, one tactile sensor group t is constructed by arranging a plurality of tactile sensors CS which can independently detect contact states in an array, and the tactile sensor group t can specify a detailed contact position depending on whether any tactile sensor CS is in a contact state.

Figure 3:
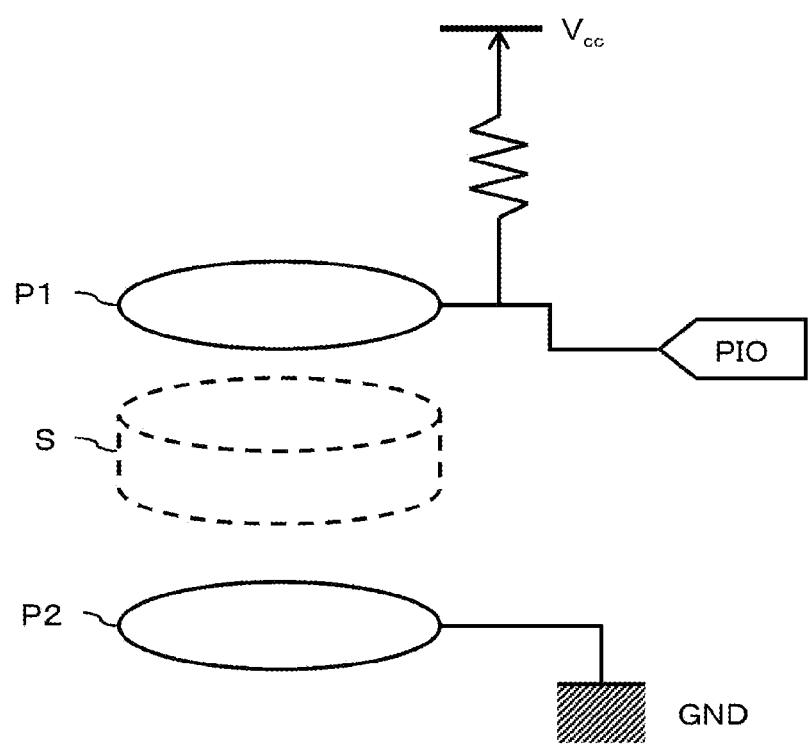
FIG. 3 is a view schematically showing the construction of a tactile sensor.

The construction of the tactile sensor CS is schematically shown in FIG. 3. The tactile sensor CS has the structure in which a space S is sandwiched between two polar plates P1 and P2, and an electric potential $V_{cc}$ is applied to one polar plate P1, and the other polar plate P2 is grounded. Also, one polar plate P1 can be input to a microcomputer via a parallel interface (PIO), and it can be determined whether or not there is in an contact state between the polar plates, i.e., an external force is acting on the tactile sensor CS.

One microcomputer is arranged in the neighborhood of every tactile sensor group t to input detection signals of all tactile sensors CS constituting a tactile sensor group and collect on/off states of these detection signals to transmit the existence/non-existence of contact with the outside in parts concerned and contact positions to a host computer.

Further, as shown in FIG. 1, the pelvic part of the humanoid robot is loaded with a triaxial acceleration sensor a1 and a triaxial angular velocity sensor (gyroscope) g1. In the neighborhood of the pelvic part, a microcomputer which measures values of these sensors is disposed to transmit measurement results thereof to the host computer.

Figure 4:
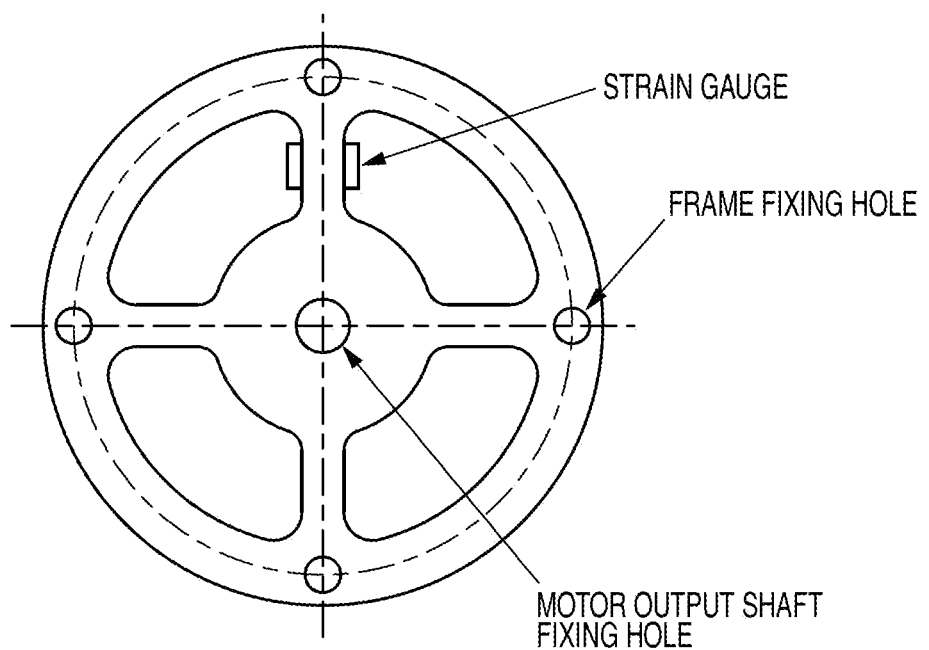
FIG. 4 is a view showing an exemplary construction of a torque sensor having rare distorted structure.

Moreover, in a joint part of this humanoid robot, a torque sensor as shown in FIG. 4 is arranged between an output shaft of an actuator motor, and a frame, and the torque generated around a joint shaft can be measured by this torque sensor. The torque sensor shown has rare distorted structure, and can be constructed by a method of measuring infinitesimal deformation volume by a strain gauge. Further, torque measurement results are collected by a microcomputer equipped in an actuator, and are then transmitted to the host computer.

Figure 5:
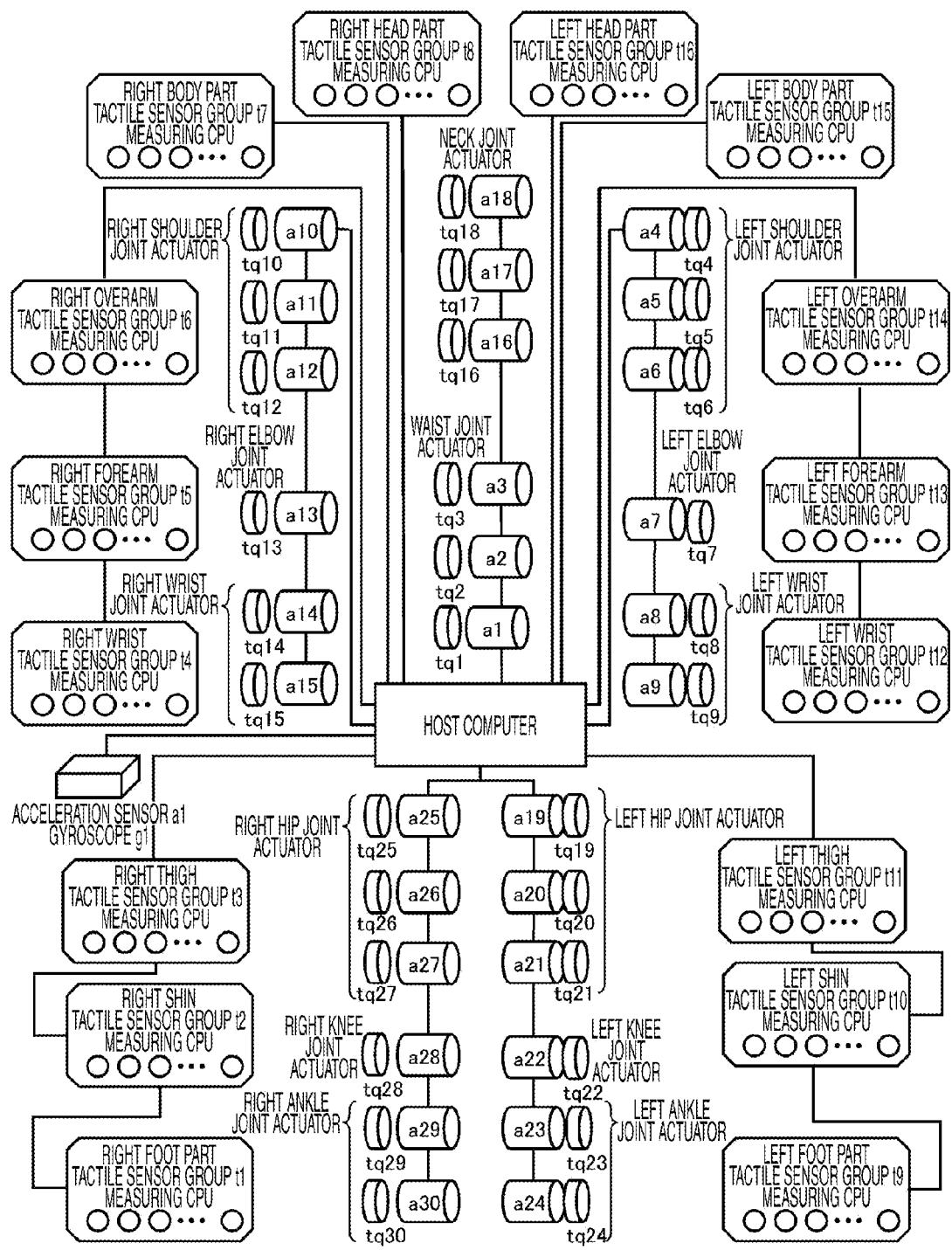
FIG. 5 is a view showing an exemplary construction of the connection topology in the humanoid robot shown in FIG. 1.

An exemplary construction of the connection topology in the humanoid robot shown in FIG. 1 is shown in FIG. 5.

The humanoid robot has triaxial waist joint actuators a1, a2, a3, and triaxial neck joint actuators a16, a17, and a18 in a body part, and these actuators are serially connected to the host computer. Further, the torque sensors tq16, tq17, and tq18 shown in FIG. 5 are arranged between an output shaft of each of the actuator motors a16, a17, and a18, and the frame. Each joint actuator receives a positional control target value through a serial cable, and transmits current output torque, joint angle, and joint angular velocity to the host computer.

Further, the humanoid robot has triaxial shoulder joint actuators a4, a5, and a6, a uniaxial elbow joint actuator a7, and biaxial wrist joint actuators a8 and a9 in a left arm part, torque sensors tq4, tq5, tq6, tq7, tq8, and tq9 shown in FIG. 5 are arranged between an output shaft of each of the actuator motors a4, a5, a6, a7, a8, and a9, and the frame, and these torque sensors are serially connected to the host computer. Similarly, the humanoid robot has triaxial shoulder joint actuators a10, a11, and a12, a uniaxial elbow joint actuator a13, and biaxial wrist joint actuators a14 and a15 in a right arm part, torque sensors tq10, tq11, tq12, tq13, tq14, and tq15 shown in FIG. 5 are arranged between an output shaft of each of the actuator motors a10, a11, a12, a13, a14, and a15, and the frame, and these torque sensors are serially connected to the host computer. Similarly, the humanoid robot has triaxial shoulder joint actuators a10, a11, and a12, a uniaxial elbow joint actuator a13, and biaxial wrist joint actuators a14 and a15 in a right arm part, torque sensors tq10, tq11, tq12, tq13, tq14, and tq15 shown in FIG. 4 are arranged between an output shaft of each of the actuator motors a10, a11, a12, a13, a14, and a15, and the frame, and these torque sensors are serially connected to the host computer.

Further, the humanoid robot has triaxial hip joint actuators a19, a20, and a21, a uniaxial knee joint actuator a22, and biaxial ankle joint actuators a23 and a24 in a left leg part, torque sensors tq19, tq20, tq21, tq22, tq23, and tq24 shown in FIG. 5 are arranged between an output shaft of each of the actuator motors a19, a20, a21, a22, a23, and a24, and the frame, and these torque sensors are serially connected to the host computer. Similarly, the humanoid robot has triaxial hip joint actuators a25, a26, and a27, a uniaxial knee joint actuator a28, and biaxial ankle joint actuators a29 and a30 in a right leg part, torque sensors tq25, tq26, tq27, tq28, tq29, and tq30 shown in FIG. 5 are arranged between an output shaft of each of the actuator motors a25, a26, a27, a28, a29, and a30, and the frame, and these torque sensors are serially connected to the host computer.

The actuators a1 to a30 to be used in the respective joint shafts are composed of, for example, a DC brushless motor, a reducer, and a position sensor which detects the rotational position of an output shaft of the reducer, and are rotationally driven according to positional control target values given from the outside, and output current output torques, joint angle and joint angular velocities. This type of joint actuator is described in, for example, JP-A-2004-181613 already transferred to the present applicant.

A right foot part tactile sensor group t1, a right shin tactile sensor group t2, and a right thigh tactile sensor group t3 are arranged at the right leg part of the humanoid robot, and these sensor groups are serially connected to the host computer. The microcomputers (as mentioned) are equipped in the tactile sensor groups t1 to t3, respectively to collect the on/off states of the tactile sensors CS in each of the tactile sensor groups, and transmit them to the host computer through a serial cable. Similarly, a left foot part tactile sensor group t9, a left thin tactile sensor group t10, and a left thigh tactile sensor group t11 are arranged in the left leg part, and the on/off states of the tactile sensors CS in each of the tactile sensor groups are collected by an internal microcomputer, and are transmitted to the host computer through a serial cable.

Further, a right wrist tactile sensor group t4, a right forearm tactile sensor group t5, and a right overarm tactile sensor group t6 are arranged at the right arm part of the humanoid robot, and the on/off states of the tactile sensor CS in each of the tactile sensor groups are collected by an internal microcomputer, and are transmitted to the host computer through a serial cable. Similarly, a left wrist tactile sensor group t12, a left forearm tactile sensor group t13, and a left overarm tactile sensor group t14 are arranged at the left arm part, and the on/off states of the tactile sensors CS in each of the tactile sensor groups are collected by an internal microcomputer, and are transmitted to the host computer through a serial cable.

Further, body part tactile sensor groups t7 and t15 are attached to the right and left, respectively, of the body part of the humanoid robot, and the on/off states of the tactile sensors CS in each of the tactile sensor groups are collected by an internal microcomputer, and are transmitted to the host computer through a serial cable.

Further, head part tactile sensor groups t8 and t16 are attached to the right and left, respectively, of the head part of the humanoid robot, and the on/off states of the tactile sensors CS in each of the tactile sensor groups are collected by an internal microcomputer, and are transmitted to the host computer through a serial cable.

Hereinafter, constructing a robot control system for acquiring a desired motion on the basis of a point of action of a force from the outside when the point of action can be detected by the above contact sensors t1 to t17 will be discussed.

Figure 6:
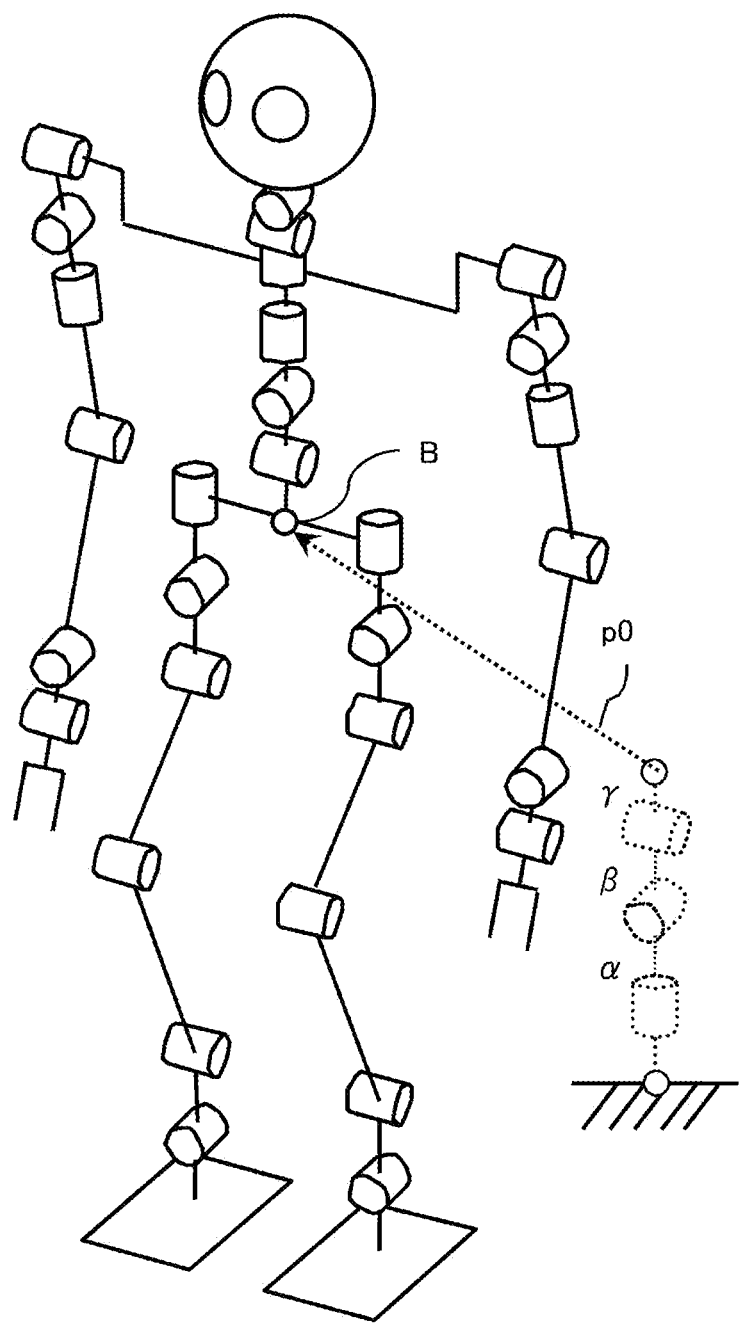
FIG. 6 is a view showing a joint degree-of-freedom model of the humanoid robot shown in FIG. 1.

A joint degree-of-freedom model of the humanoid robot shown in FIG. 1 is shown in FIG. 6. As can be seen from this drawing, a bipedal walking mobile robot can be expressed as an open link tree structure with a pelvis B as a basis.

In the case of the mobile robot, the robot can move freely in a world space, and can change its posture. Accordingly, Euler angle $\alpha=(\alpha,\beta,\gamma)^T$ of the pelvis B and the position $p_0(p_{0x}, p_{0y}, p_{0z})^T$ thereof are introduced as state variables for expressing the whole state of the robot.

Then, a generalized variable q representing the whole posture of the robot can be expressed like the following Expression (1), using a vector θ in which all joint values serving as the current states of actuators can be enumerated, and a vector in which the posture α and position $p_0$ of a base are enumerated as the motion state of the robot.

$$q = (\alpha, p_0, \theta)^T \tag{1}$$

As an important concept in the robot control of a force control system, there is a concept called "operational space." The operational space is a space for describing the relationship between a force acting on the robot, and acceleration to be generated. The operational space becomes indispensable when a contact way between the robot and an environment is used as constraint conditions when joint angles of the robot are not position-controlled, but force-controlled. The constraint conditions referred to here include, for example, constraint conditions on the self-interference of the robot, constraint conditions of a joint movable angle, and phenomena called "a hand fits on an object" and "right and left eyes become horizontal."

In a link structure in which a rigid body link is connected via joints, a vector in which all values of the joints can be enumerated is called a generalized variable, and is expressed by q. When the relationship with a time differential value of the generalized variable q is associated like the following Expression (2), using Jacobian J, an operational space can be defined with respect to a physical quantity x.

$$\dot{x} = J\dot{q} \tag{2}$$

The Cartesian coordinate system for execution of a task, such as a finger position posture at the tip of a manipulator, is an example of the operational space. As for the basic idea of the operational space, refer to, for example, "A unified approach to motion and force control of robot manipulators" (The operational space formulation, IEEE Journal of Robotics and Automation, and RA-3 (1), pp. 43-53, 1987).

Generally, it is known that the equation of motion of the whole link structure can be expressed as shown in the following Expression (3).

$$\tau = H\ddot{q} + b - J^T f \quad (3)$$

Here, τ is a generalized force corresponding to the generalized variable q, b is the gravitational force/Coriolis force, and f is an external force acting on the operational space. The above Expression (3) is changed like the following Expression (4).

$$\ddot{x} = \Lambda^{-1} f + c \quad (4)$$

Here, $\Lambda^{-1}$ is called an operational space inertia inverse matrix, and is expressed like the following Expression (5). It is noted that H is an inertia matrix for a joint space of the whole structure.

$$\Lambda^{-1} = J H^{-1} J^T \quad (5)$$

Further, c of a third term of a right side of the above Expression (4) is equivalent to operational space bias acceleration (that is, the acceleration acting on an operational space in a case where an external force does not act), and is expressed like the following Expression (6).

$$c = J H^{-1}(\tau - b) + \dot{J}\dot{q} \quad (6)$$

The operational space, i.e., the relationship between acceleration and a force is given by an operational space inertia inverse matrix. The operational space inertia inverse matrix is an important physical quantity which allows application to a number of fields, such as force control, dynamic simulation, computer animation, posture editing, and external force estimation. For example, a motion generation method of generating the motion of a humanoid link-type joint by adding constraint conditions in consideration of dynamics to calculate joint acceleration or by simultaneously solving dynamical constraint conditions formulated using an operational space inertia inverse matrix representing the relationship between a force acting a link, and acceleration caused by the force, and kinematic constraint conditions is suggested (for example, refer to JP-A-2003-231077.

In addition, in the calculation as defined in the above Expression (5), an inertia matrix H for a joint space of the whole structure is interposed, and thus, needless calculation is made. Therefore, a great amount of calculation is needed in the calculation of the operational space inertia inverse matrix. Therefore, there is a problem that this is not fit for real-time processing. In contrast, by applying the direct dynamic operation which obtains generalized acceleration (joint acceleration) from the generalized force (joint force) of the link structure, the operational space inertia inverse matrix can be calculated at high speed, and calculational load can be relieved. As for a high-speed calculation method of the operational space inertia inverse matrix and the bias acceleration, refer to JP-A-2007-108955 already transferred to the present applicant.

Motion requirements for positions, velocity, and acceleration are given as acceleration at the left side of Expression (4). The force f to be applied to the operational space in order to realize this can be acquired by solving linear complementary problems as shown in the following Expressions (7) and (8).

$$\ddot{x} = \Lambda^{-1} f + c \quad (7)$$

$$f_{\min_i} \leq f_i \leq f_{\max_i} \quad (8)$$

Further, if a requirement under which a known force $f_k$ is generated in an operational space $J_k$ is given as a motion requirement for a force, in conjunction with the above motion requirements for positions, velocity, and acceleration, a generalized force $\tau_v$ which is required as a whole is expressed like the following Expression (9).

$$\tau_v = J^T f + J_k^T f_k = J_v^T f_v \quad (9)$$

Here, $f_v$ is a coupling vector of f and $f_k$, and $J_v$ is a Jacobian representing an operational space of $f_v$ in which J and $J_k$ are enumerated longitudinally.

$f_v$ is a virtual force including even a force which does not exist actually. Actually, as shown in the following Expression (10), the virtual force $f_v$ is realized, cooperatively using an external force $f_e$ obtained from an environment and a torque $\tau_a$ of an actuator of a joint part.

$$J_v^T f_v = J_e^T f_e + J_a^T f_a \quad (10)$$

Here, $J_e$ and $J_a$ are Jacobians corresponding to an operational space on which $f_e$ and $\tau_a$ act.

$f_e$ and $\tau_a$ which satisfy Expression (10) do not always exist. Thus, a corrected component $\Delta f_v$ of the virtual force $f_v$ of the above Expression is taken into consideration.

$$J_v^T (f_v - \Delta f_v) = J_e^T f_e + J_a^T f_a \quad (11)$$

The solution of the above Expression (11) can be obtained by solving such problems as the following Expressions (12) and (13).

$$\min \frac{1}{2} e^T Q_1 e + \frac{1}{2} y^T Q_2 y \quad (12)$$

$$\text{subject to } Ay \geq d \quad (13)$$

Here, e is a value which is obtained by subtracting a right side from a left side of the above Expression (11), and which gives an error of the above Expression (11). Further, y is a coupling vector of $\tau_a$, $f_e$, and $\Delta f_v$. Thus, a first term of the above Expression (12) represents a condition for minimization of an error for satisfaction of the above Expression (11), and a second term of the above Expression (12) represents a condition for minimization of a virtual force correction amount $\Delta f_v$, an actual force $f_e$, and $\tau_a$. $Q_1$ and $Q_2$ are positive definite symmetric matrices representing the weight for minimization therebetween. An inequality constraint expression (13) gives upper limits, lower limits, etc. of a vertical reaction force, a friction condition and a joint generating force.

If the above Expression (12) and (13) are arranged, they are formulated as secondary programming problems as shown in the following Expressions (14) and (15).

$$\min \frac{1}{2} y^T Q y + r^T y \quad (14)$$

$$\text{subject to } Ay \geq d \quad (15)$$

By using the secondary programming problems, the above Expressions (14) and (15) can be solved with respect to y, and further, $\tau_a$, $f_e$, and $\Delta f_v$. The torque $\tau_a$ of the actuator of the joint part obtained by solving these expressions may act on the robot.

Unless an operational space $J_e$ corresponding to an external force $f_e$ obtained from an environment is properly selected, the solutions of Conversion Expressions (14) and Expression (15) for obtaining an actual force from a virtual force will not become valid. That is, the operational space $J_e$ should be set with respect to a part and directions where an external force is actually obtained.

Figure 7:
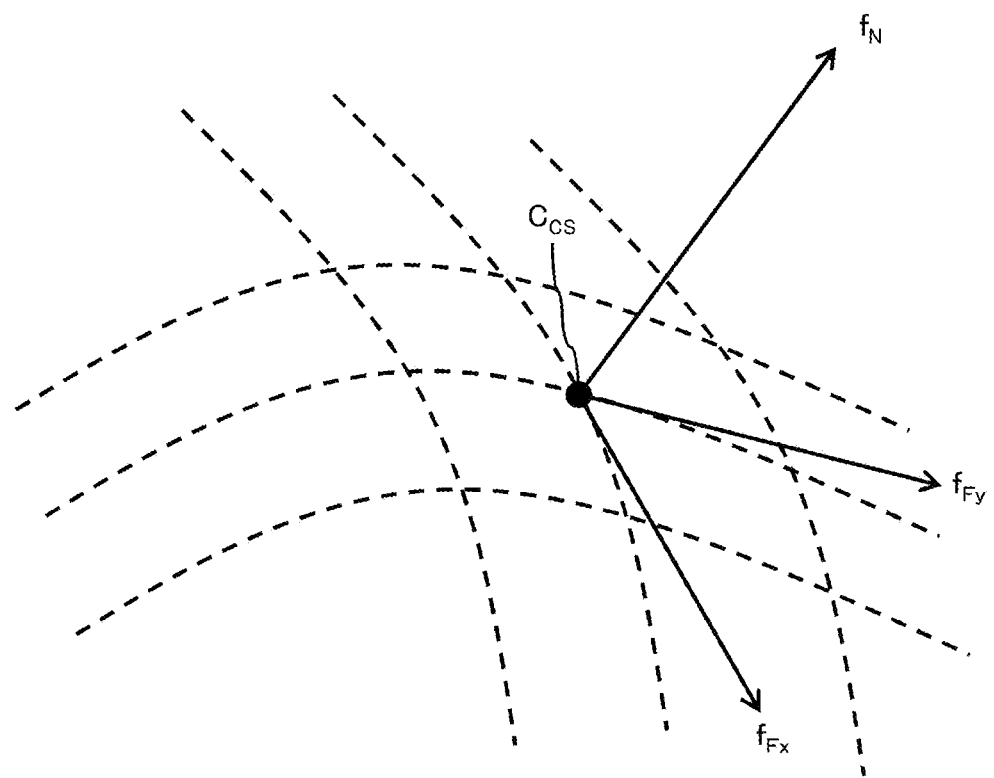

Generally, a part which actually contacts the outside can be considered as a point where an external force is supplied from an environment. For this reason, $J_e$ is set to a contact part with the outside obtained from a contact sensor. The direction of the operational space may be set in a total of three directions including a direction (one-dimensional) of a vertical reaction force, and directions (two-dimensional) of a frictional force. That is, as shown in FIG. 7, when the contact sensor CS is turned on, a direction ($f_N$) of a vertical reaction force and directions ($f_{Fx}$, $f_{Fy}$) of a frictional force in a part where a contact sensor CS is arranged may be determined, and an operational space may be defined. The direction of a vertical reaction force is approximated well by a normal vector of a robot shape in the part where the contact sensor CS is arranged. As for the directions of a frictional force, two arbitrary directions orthogonal thereto may be calculated. That is, an actual external force is set in the direction of a normal vector and the direction of a tangent vector of the robot shape in a contact part.

In addition, part of well-known reverse motion kinematic operation may be used for calculation of a Jacobian. The operation of obtaining a left side from a right side of the above Expression (3) is generally known as inverse dynamic operation, and can be written like the following Expression (16).

$$\tau = INV(q, \dot{q}, \ddot{q}, g, f) \quad (16)$$

Here, g represents the gravitational acceleration. As for a construction method of the inverse dynamic operation which is extended in the form which can be applied to a link chain with a branch floated in the air to which an external force acts, like a humanoid robot, for example, refer to "Generation of a full body motion of a humanoid robot with a dynamic filter" (Doctoral Dissertation Specialized in Information Engineering of Engineering Department of Tokyo University, December, 1999, Section 4.2.2) written by Kenichiro Nagasaka.

When a person looks at the right side of the above Expression (3) well, a Jacobian can be calculated like the following Expression (17).

$$i\text{-th column of } J^{T=-INV}(q,0,0,0,e_i) \quad (17)$$

Here, $e_i$ represents that an i-th element has a unit vector of 1. If the above Expression (17) is executed in a state where a unit force is made to act, with respect to the direction ($f_N$) of a vertical reaction force and the direction ($f_{Fx}$, $f_{Fy}$) of a frictional force in parts where all contact sensors CS are arranged, in the case of the above operation space $J_e$, each line of the operational space $J_e$ can be obtained.

The torque $\tau_a$ of an actuator of a joint part obtained by solving the above Expressions (14) and (15) needs to be realized precisely. Since the torque of an actuator is proportional to the electrical current value thereof, the operation of the torque is allowed if the electrical current value is controlled. However, since any friction or the like which is difficult to model exists in an actual motor driving system, a desired torque cannot be obtained only by sending an electrical current command in an open loop.

Thus, in this embodiment, a torque sensor (refer to FIG. 4) arranged at a joint part detects information on the torque which acts on the joint part, and feeds the information back to an electrical current command. As a result, even if any friction which is difficult to model is included in the motor driving system, it becomes possible to follow a desired torque precisely. For example, favorable torque follow-up is allowed using a well-known disturbance observer, etc.

As described above, in this embodiment, generating force target values of all actuators are determined by detecting contact parts with the outside without omission, using contact sensors arranged in a distributed manner over the whole body surface of a humanoid robot, and by exactly solving a mechanical model so that a desired motion may be achieved, while external forces having the detected contact parts as points of action are properly used. Moreover, favorable tactile force interaction in which points of action are not limited can be realized by compensating a force, which is difficult to model, within each joint which connects links by a torque sensor provided at a joint part.

Figure 8:
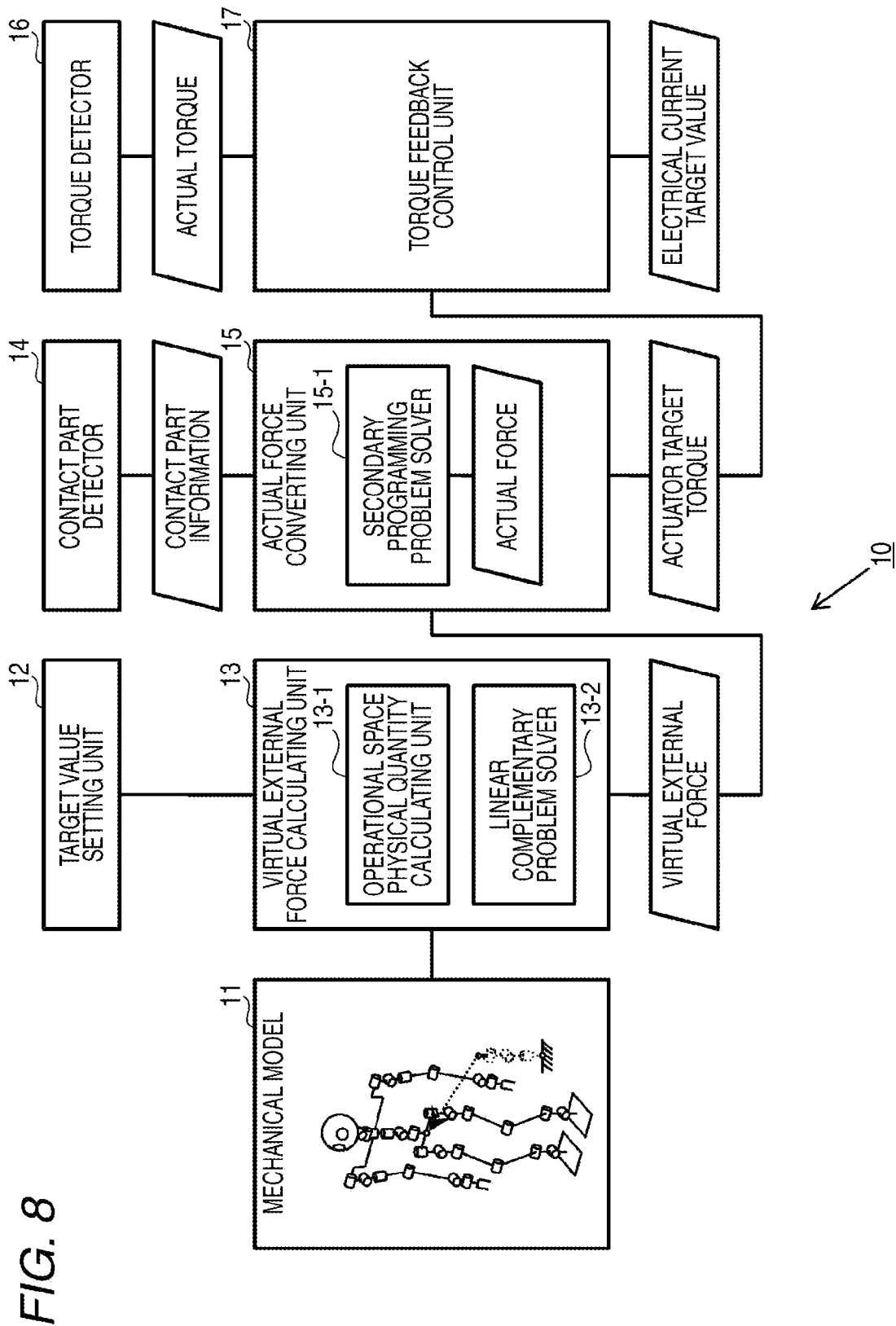
FIG. 8 is a functional block diagram of a control system according to an embodiment of the present invention.

A functional block diagram of the control system 10 which realizes such a robot control method is shown in FIG. 8.

A mechanical model 11 holds geometric parameters and dynamical parameters of rigid body links of a robot to be controlled. Physical quantities which vary every moment according to the current state of the robot, such as joint angles, are also included in the data which the mechanical model 11 holds.

The target value setting unit 12 sets target values relating to positions, velocity, acceleration, posture, angular velocity, angular acceleration, force, moment, etc., which are imposed on respective parts, joints, and momentum of the robot. For example, as for the positions, velocity, acceleration, posture, angular velocity, and angular acceleration, the target values are set as values at a left side of the above Expression (4). The known force $f_k$ is stored separately.

A virtual external force calculating unit 13 acquires a virtual external force which is required to realize the target values set in the target value setting unit 12. Specifically, as for an unknown virtual external force, a force f which satisfies the above Expressions (7) and (8) is acquired by a linear complementary problem solver 13-2. A coefficient matrix $\Lambda^{-1}$ and a bias vector c of the above Expression (7) are acquired using high-speed operation of operational space physical quantities which is reported already (for example, refer to JP-A-2007-108955), in an operational space physical quantity calculating unit 13-1. Information on the mechanical model is utilized for calculation of the operational space physical quantities. In a case where a known virtual external force $f_k$ is further added, a virtual external force which is required as a whole is obtained by Expression (9).

A contact part detector 14 is composed of a tactile sensor group attached to the surface of the whole body of the robot (refer to FIG. 1), and detects a part where the robot is in contact with the outside. As the contact part information, a rigid body link ID in contact with the outside, and contact position coordinates seen from the rigid body link are output.

The actual force converting unit 15 converts a virtual external force $\tau_v = J^T_v f_v$, which is obtained in the virtual external force calculating unit 13, into actual forces, i.e., the external force $f_e$ obtained from an environment, and the torque $\tau_a$ of an actuator of a joint part so that the above Expression (11) may be satisfied. The output results of the contact part detector 14 are used for the point of action and direction of the external force obtained from an environment. A vertical reaction force and a frictional force which are actual external forces are set in the direction of a normal vector and the direction of a tangent vector, of a robot surface shape in a contact part detected by the contact part detector 14 (as mentioned above). Conversion processing from the virtual external force into the actual forces is achieved by solving the above Expressions (14) and (15) by a secondary programming problem solver 15-1. Among them, the actual force converting unit 15 outputs the torque $\tau_a$ of an actuator.

A torque detector 16 is a torque sensor (refer to FIG. 4) attached to a joint part, and measures and outputs an actual torque which acts on each joint part.

A torque feedback control unit 17 detects the variation between the torque detected by the torque detection unit 16, and a command torque, and feeds the variation back to an electrical current target value. As a result, disturbances, such as friction and inertia, which are included in a motor driving system, are suppressed, and an actuator target torque is precisely realized in each joint.

Figure 9:
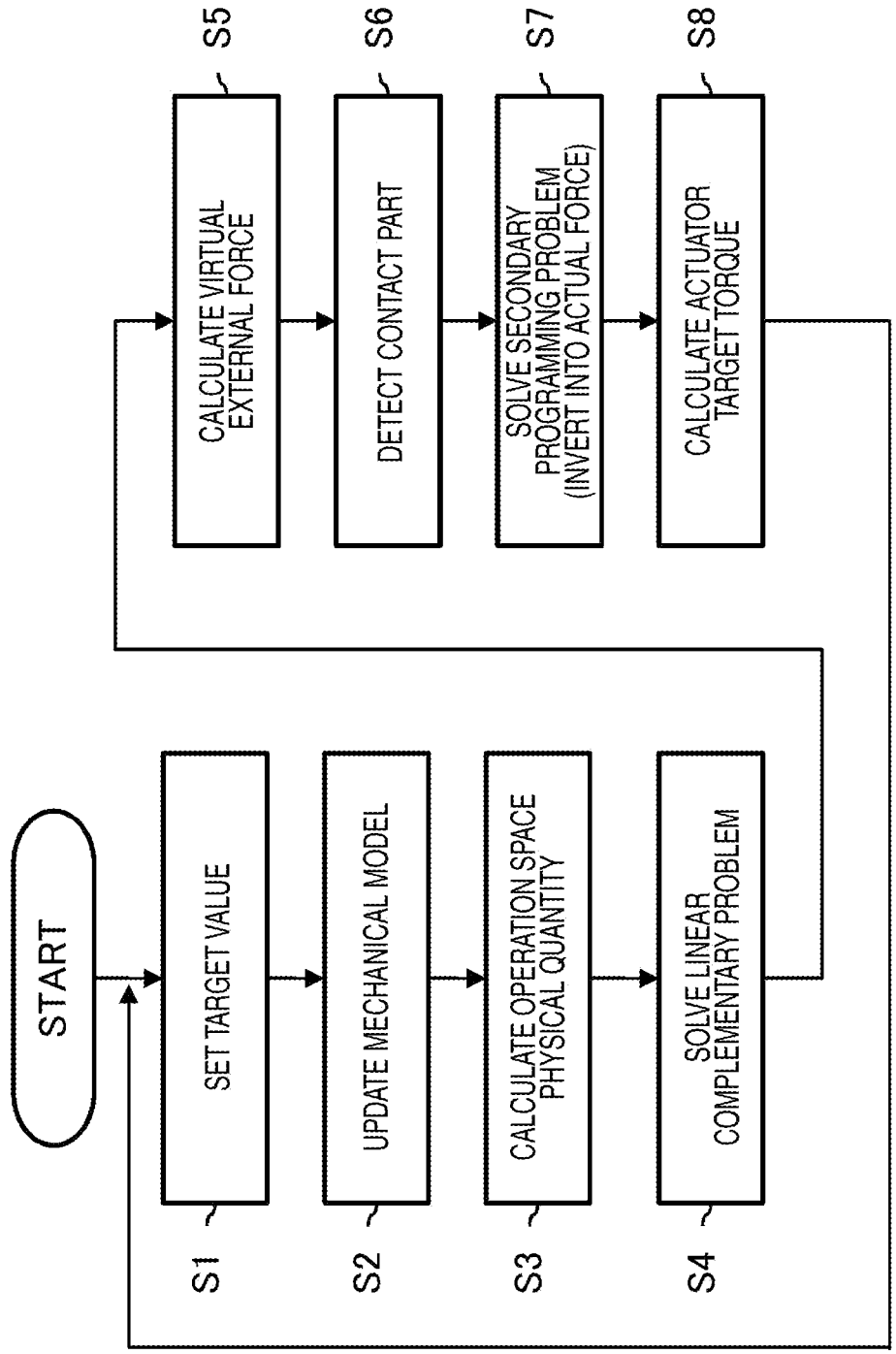
FIG. 9 is a flow chart showing a sequence for calculating a target torque of an actuator by a virtual external force calculating unit and an actual force converting unit.

In FIG. 9, a sequence for calculating a target torque of an actuator by the virtual external force calculating unit 13 and the actual force converting unit 15 is shown in the form of a flow chart.

If target values are set in the target value setting unit 12 (Step S1), joint angle, angular velocity, the posture of a pelvic part, angular velocity, etc. are detected, and the state of the mechanical model 11 is updated so as to coincide with the current motion state of the robot (Step S2).

Next, operational space physical quantities are calculated (Step S3) in the virtual external force calculating unit 13, and an unknown virtual external force is further calculated by solving a linear complementary problem in the virtual external force calculating unit 13 (Step S4).

Next, a total of the virtual external force is obtained according to the above Expression (9) in the virtual external force calculating unit 13 (Step S5).

Next, if a contact part is detected in the contact part detector 14 (Step S6), the virtual external force is converted into actual forces by solving a secondary programming problems in the actual force converting unit 15 (Step S7).

Then, among the actual forces, an actuator-generated component is extracted, and is adopted as an actuator target torque (Step S8).

The above processing is executed in a predetermined cycle (for example, 1 millisecond).

Figure 10:
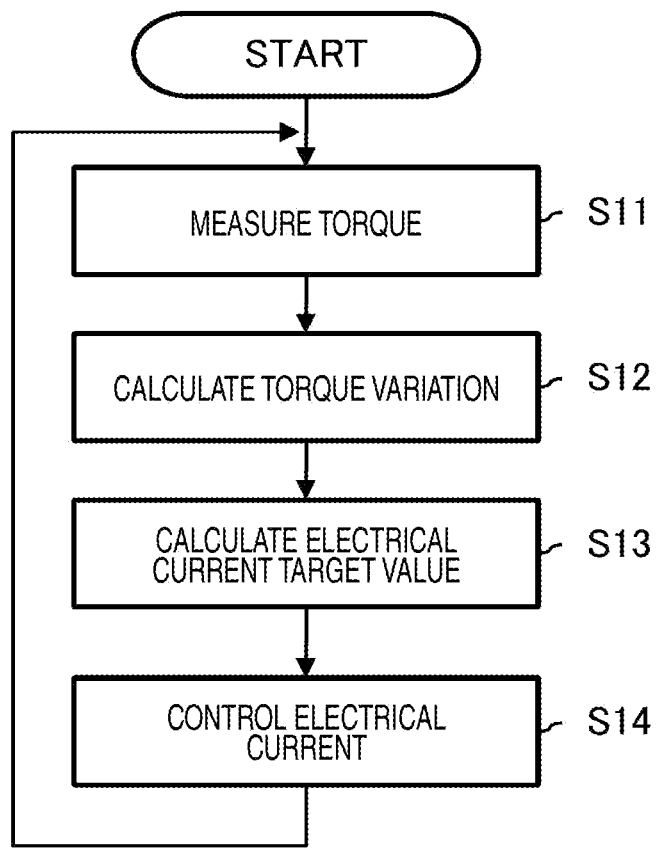
FIG. 10 is a flow chart showing a sequence for reducing any variation between an actuator force which the actual force converting unit outputs, and a torque which a torque detector has detected.

In FIG. 10, a sequence for reducing any variation between an actuator force which the actual force converting unit 15 outputs, and a torque which the torque detector 16 has detected, which is executed by the torque feedback control unit 17, is shown in the form of a flow chart.

If the torque detector 16 measures the torque applied to a joint part (Step S11), the torque feedback control unit 17 calculates a variation between the measured torque and an actuator target torque which the actual force converting unit 15 outputs (Step S12).

Then, on the basis of the calculated torque variation, the torque feedback control unit 17 calculates an electrical current target value to an actuator motor (Step S13), and carries out electrical current control (Step S14).

As such, favorable tactile force interaction in which points of action are not limited can be realized by compensating a force, which is difficult to model, within each joint which connects links by a torque sensor disposed at a joint part.

The torque feedback control unit 17 repeatedly executes the sequence shown in FIG. 10 in a faster cycle (for example, 100 microseconds) independently from the processing by the virtual external force calculating unit 13 and actual force converting unit 15 which are shown in FIG. 9.

Figure 11:
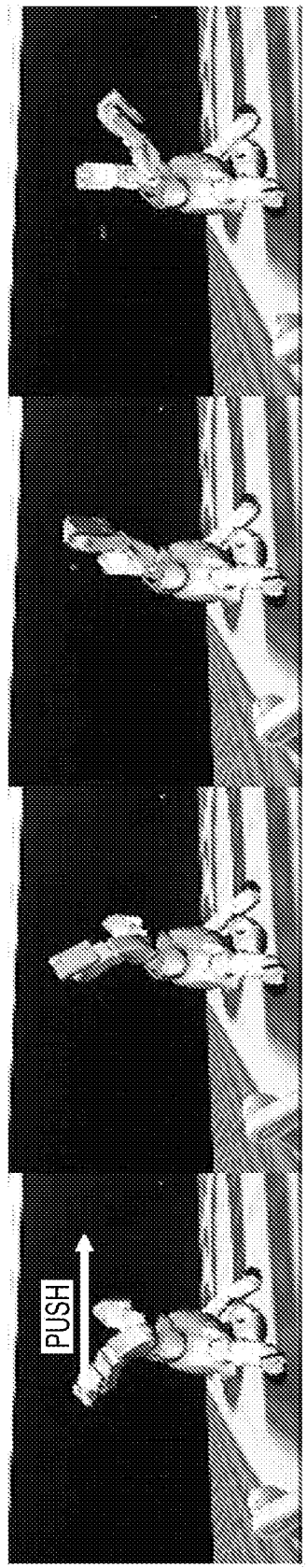
FIG. 11 is a view showing an aspect in which control of the humanoid robot has been made using a control system according to an embodiment of the present invention.

An aspect in which control of the humanoid robot has been made using the control system 10 which has been described hitherto is shown in FIG. 11. In the example shown, the motion purpose is imposed so that the amount of a translational motion may be maintained at zero.

If the robot is placed on the ground in a hand-standing state, the contact part detector 14 detects the contact points of a head part and a hand part, and the actual force converting unit 15 autonomously achieves the purpose of translational momentum=0 (fixation of a gravitational center), by making full use of a floor reaction force obtained therefrom, and the joint forces of the whole body. As a result, the hand standing can be maintained without falling.

In the control system related to this embodiment, the force control is performed. Thus, the robot has the passivity for redundancy and can also touch the outside flexibly. In the example shown in FIG. 11, after the robot touches a floor surface, the robot pushes its right leg tip forward. Although the right foot part of the robot moves passively and forward accordingly, the robot is maintained in a well-balanced manner without falling as a whole by cooperatively operating the whole body, such as moving a left leg reversely backward, as a result of mechanical calculation. That is, it can be understood that the robot has passivity without violating the purpose of fixation of the gravitational center.

Figure 12:
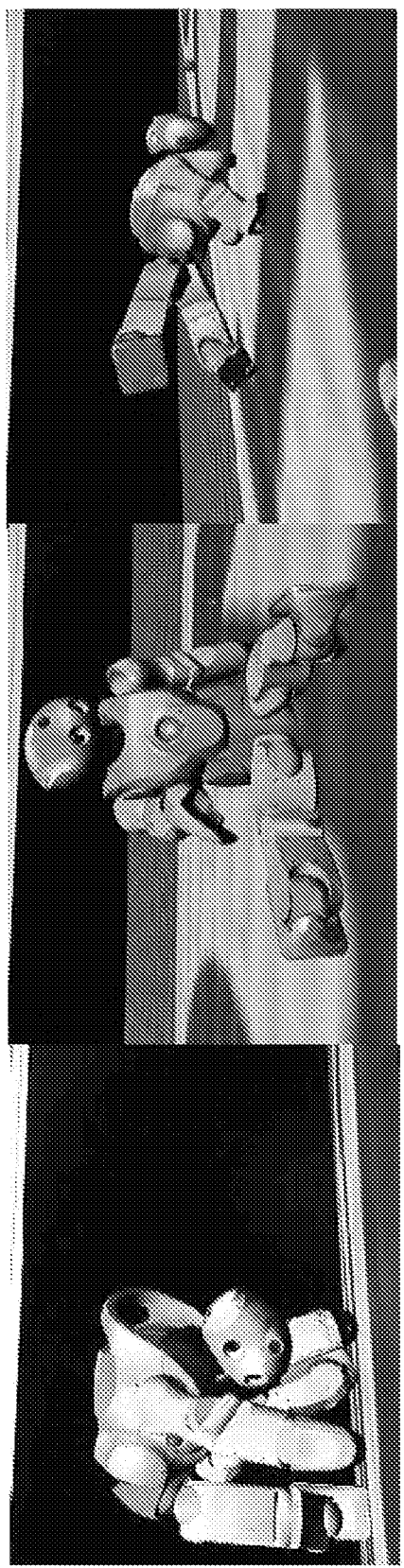
FIG. 12 is a view showing an aspect in which control of the humanoid robot has been made using the control system according to an embodiment of the present invention.

Further, an example in which the motion purpose of translational momentum=0 (fixation of the gravitational center) similarly to FIG. 11 in other ground-touching states is given is shown in FIG. 12. On the left of this drawing, a case where the robot is placed on the floor surface in a crawling state, and contact points are created at the tips of both legs and both hands is shown. Further, in the middle of this drawing, a case where the robot is placed on the floor surface in a seating position, and contact points are created at a buttock part, leg parts, and foot parts is shown. Further, on the right of this drawing, a case where the robot is placed on the floor surface in a bridge posture, and contact points are created at one foot and tips of both hands is shown.

Although the robot is in the state of a removed force until it is placed on the floor surface, the posture shown is maintained by making full use of the floor reaction force and joint forces of the whole body so that the purpose of fixation of the gravitational center may be achieved simultaneously with ground-touching. Further, even after the robot touches the floor surface, the point that the robot has passivity with respect to redundancy is similar to the example shown in FIG. 11.

In the above several examples, the control system is the same, the mounting specialized in a point of action is not included at all. By the present control system, it can be understood that various and flexible tactile force interaction with the outside can be achieved, using an arbitrary place of the body as a point of action.

The present invention has been described in detail hitherto, referring to a specific embodiment. However, it is obvious that those skilled in the art can make modifications and substitutions of the embodiment without departing from the spirit of the present invention.

Although the embodiment in which the present invention is applied to a bipedal walking legged mobile robot has been mainly described in this specification, the spirit of the present invention is not limited thereto.

In summary, the present invention has been disclosed in an illustrative manner, and the contents described in this specification should not be definitely interpreted. In order to evaluate the spirit of the present invention, the claims should be taken into consideration.

It should be understood by those skilled in the art that various modifications, combinations, sub-combinations and alterations may occur depending on design requirements and other factors insofar as they are within the scope of the appended claims or the equivalents thereof.

What is claimed is:

1. A robot apparatus comprising:
   a link structure having a plurality of rigid body links;
   a joint actuator which drives a joint which connects links of the link structure together,
   a torque detector configured to detect a torque generated at the joint;
   a virtual external force calculator configured to calculate, independent of external force applied to the link structure, a virtual force virtually acting on the link structure but not actually acting on the link structure, the virtual external force calculator comprising an operational space calculating unit and a linear complementary problem solver, wherein the linear complementary problem solver is configured to calculate the virtual force based at least in part on data calculated by the operational space calculating unit;
   a plurality of contact sensors distributed over a surface of the link structure and configured to detect parts of contact between the link structure and persons or objects;
   an actual force converter configured to convert the virtual force calculated by the virtual external force calculator into an external force capable of actually existing and an actuator force of the joint actuator, using contact information detected by the plurality of contact sensors,
   an actuator driver configured to make the joint actuator generate the actuator force; and
   a torque compensation controller configured to exert control such that a variation between the actuator force and the torque detected by the torque detector is reduced,
   wherein the linear complementary problem solver is configured to solve the linear complementary problems given by:

$$\ddot{x} = \Lambda^{-1} f + c$$

$$f_{min\ i} \leq f_i \leq f_{max\ i}$$

where x is a physical quantity, $\Lambda^{-1}$ is an operational space inertia inverse matrix, f is a vector representing the virtual force, $f_i$ is the i-th component of the vector f, and c represents operational space bias acceleration.

2. The robot apparatus of claim 1, further comprising a triaxial acceleration sensor and a triaxial angular velocity sensor both disposed at a pelvic portion of the robot apparatus and configured to detect acceleration and angular velocity, respectively, of the robot apparatus.

3. The control system according to claim 1,
   wherein the actual force converter sets the external force capable of actually existing in a direction of a normal vector of a link structure shape at a part of contact detected by the plurality of contact sensors.

4. The control system according to claim 1,
   wherein the actual force converter sets the external force capable of actually existing in a direction of a tangent vector of a link structure shape at a part of contact detected by the plurality of contact sensors.

5. A control system which controls a link structure, the link structure having a plurality of rigid body links connected via joints and driven by a joint actuator, the control system comprising:
   a virtual external force calculator configured to calculate, independent of external force applied to the link structure, a virtual force virtually acting on the link structure but not actually existing, the virtual external force calculator configured to receive at least one target value of the link structure and the virtual external force calculator comprising an operational space calculating unit and a linear complementary problem solver, wherein the linear complementary problem solver is configured to calculate the virtual external force using, at least, operational space data from the operational space calculating unit;
   a plurality of contact sensors distributed over a surface of the link structure and configured to detect contact between the link structure and persons or objects; and
   an actual force converter configured to convert the virtual force calculated by the virtual external force calculator into an external force capable of actually existing and the actuator force of the joint actuator, using contact information detected by the plurality of contact sensors,
   wherein the linear complementary problem solver is configured to solve the linear complementary problems given by:

$$\ddot{x} = \Lambda^{-1} f + c$$

$$f_{min\ i} \leq f_i \leq f_{max\ i}$$

where x is a physical quantity, $\Lambda^{-1}$ is an operational space inertia inverse matrix, f is a vector representing the virtual force, $f_i$ is the i-th component of the vector f, and c represents operational space bias acceleration.

6. The control system of claim 5, wherein the actual force converter comprises a secondary programming problem solver configured to convert the virtual force to the external force.

7. The control system of claim 5, wherein the at least one target value is indicative of a property of the link structure selected from the group consisting of: position, velocity, acceleration, posture, angular velocity, angular acceleration, force, and moment.

* * * * *